United States Patent
Nuebling

(10) Patent No.: US 7,427,743 B2
(45) Date of Patent: Sep. 23, 2008

(54) OPTOELECTRONIC SENSOR

(75) Inventor: Ralf Ulrich Nuebling, Denzlingen (DE)

(73) Assignee: Sick AG, Waldkirch (DE)

( * ) Notice: Subject to any disclaimer, the term of this patent is extended or adjusted under 35 U.S.C. 154(b) by 185 days.

(21) Appl. No.: 11/477,748

(22) Filed: Jun. 28, 2006

(65) Prior Publication Data

US 2007/0007439 A1    Jan. 11, 2007

(30) Foreign Application Priority Data

Jul. 5, 2005    (DE)    ........................ 10 2005 031 710

(51) Int. Cl.
  *G02B 27/10*    (2006.01)
(52) U.S. Cl. ........................ 250/216; 359/623; 362/613
(58) Field of Classification Search ................. 362/612, 362/613, 616, 626, 555, 574, 507, 538; 235/454; 250/221, 208.1, 551, 216; 359/623

See application file for complete search history.

(56) References Cited

U.S. PATENT DOCUMENTS

| 3,670,260 | A |   | 6/1972 | Koester et al. |
|---|---|---|---|---|
| 5,414,559 | A |   | 5/1995 | Burghardt et al. |
| 5,861,992 | A | * | 1/1999 | Gelbart ........................ 359/619 |
| 5,886,338 | A | * | 3/1999 | Arackellian et al. .... 235/472.01 |
| 6,064,528 | A | * | 5/2000 | Simpson, Jr. ................. 359/619 |
| 6,853,490 | B2 | * | 2/2005 | Wang et al. .................. 359/621 |
| 6,916,097 | B2 | * | 7/2005 | Omoda et al. .................. 353/31 |
| 7,070,106 | B2 | * | 7/2006 | Knowles et al. ........ 235/462.14 |
| 2002/0084952 | A1 |   | 7/2002 | Morely et al. |
| 2003/0146303 | A1 |   | 8/2003 | Schnee et al. |
| 2004/0223227 | A1 | * | 11/2004 | Ohmori et al. .............. 359/619 |
| 2007/0153392 | A1 | * | 7/2007 | Reynolds et al. ............ 359/619 |

FOREIGN PATENT DOCUMENTS

| DE | 19841040 A1 | 3/1999 |
|---|---|---|
| DE | 10245811 A1 | 5/2003 |
| WO | WO 99/50596 A2 | 10/1999 |
| WO | WO 00/57229 A1 | 9/2000 |
| WO | WO 01/81955 A3 | 11/2001 |
| WO | WO 02/067015 A1 | 8/2002 |

* cited by examiner

*Primary Examiner*—Thanh X Luu
*Assistant Examiner*—Tony Ko
(74) *Attorney, Agent, or Firm*—Townsend and Townsend and Crew, LLP

(57) ABSTRACT

An optoelectronic sensor has a receiving optics and a lighting arrangement in the vicinity of the receiving optics. A plurality of light emitting diodes (LED) are linearly arranged relative to each other, and they illuminate a light receiving area. Anamorphic imaging optics for each LED include an optical condenser element with a planar side facing the LED and an oppositely facing non-planar, e.g. curved, side. A cylindrical lens is associated with the condenser elements. The optical condenser elements of the arrangement are of like construction. The LEDs are axially offset relative to the optical axis of associated condenser elements as a function of the distance between the LEDs and the receiving optics.

17 Claims, 4 Drawing Sheets

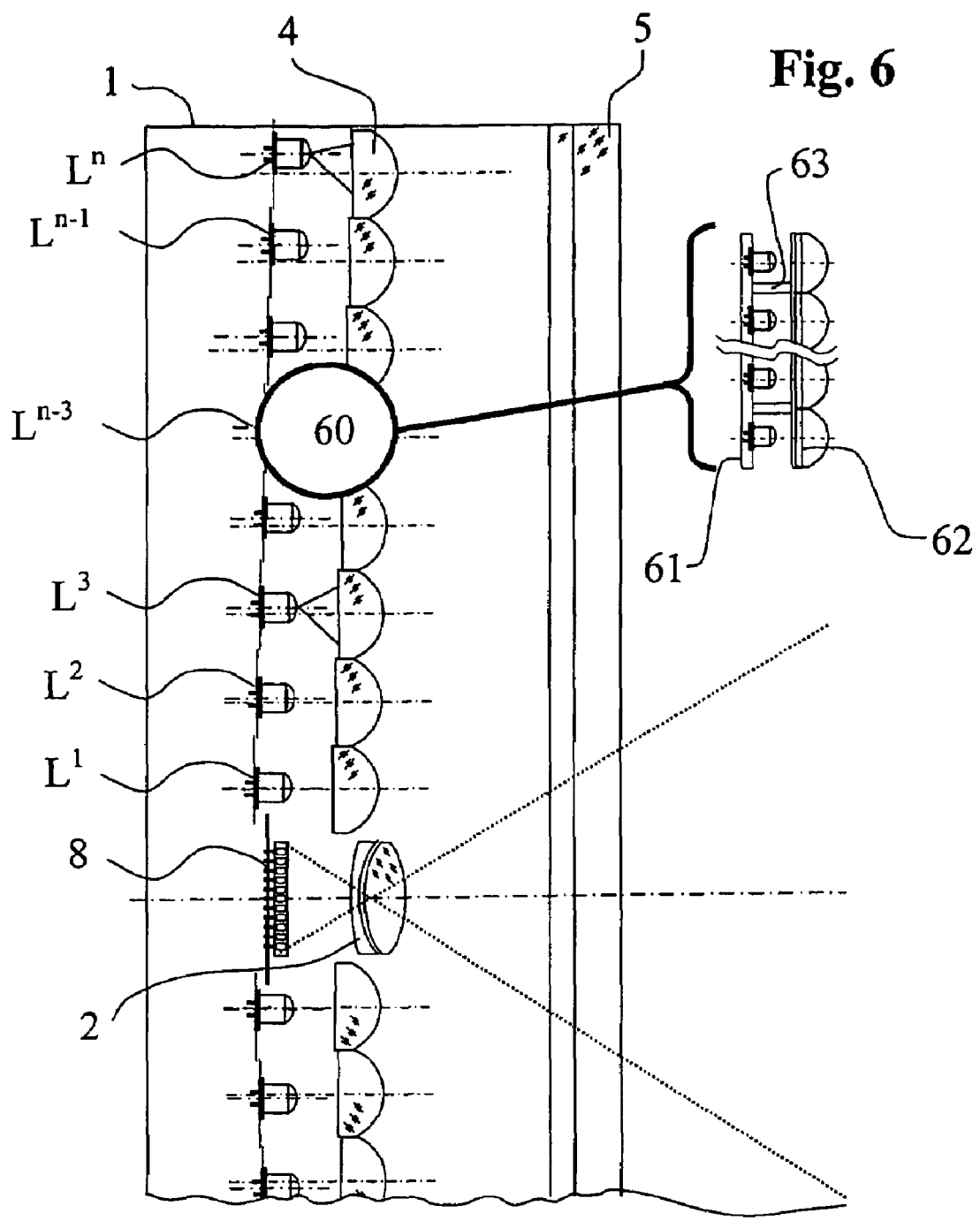

OPTOELECTRONIC SENSOR

RELATED APPLICATIONS

This application claims the priority of German patent application No. 10 2005 031 710.3 filed Jul. 5, 2005, the disclosure of which is incorporated herein by reference.

BACKGROUND OF THE INVENTION

The present invention concerns optoelectronic sensors and in particular a line camera with a receiving optics and a lighting arrangement in the vicinity of the receiving optics. The lighting arrangement consists of several, linearly aligned light emitting diodes (LED) for illuminating a linear receiving area with anamorphic imaging optics. The linear receiving area is imaged by the receiving optics on a position resolving, linear light receiver.

Such optoelectronic sensors are part of the state of the art and are used, for example, for imaging an object as well as for reading optically readable codes.

Sensors with a common lighting arrangement employ LEDs for illuminating the receiving area. The LEDs have no light bundling components or collimator, so that a relatively large proportion of the light emitted by the LEDs does not even illuminate the receiving area, which is an inefficient use of the generated light.

It is also known to construct such sensors by bundling the light emitted by the LEDs with a beam former or light bundling element to more or less concentrate the light in the receiving area.

For purposes of the present invention and this disclosure, the term "light" should be understood to include all types of optical radiation, including but not limited to all light from ultraviolet and infrared light and beyond.

The efficiency of such simple illumination without light bundling elements is particularly low when the distance between the optoelectronic sensor and the receiving area is relatively large.

Optoelectronic sensors fitted with a light bundling element frequently encounter the problem that the light distribution in the receiving area, that is, the light illumination profile, is poor and insufficient for many applications. For example, a homogeneous light distribution is often not assured. It is further not possible or is very costly to generate an intended illumination profile, for example to compensate for a decrease in the peripheral illumination of the receiving area along the periphery of the receiving optics. Further problems are encountered with such sensors when the receiving objective and the LEDs for illuminating the receiving area are arranged along a common line. Although this provides the optoelectronic sensor with good focal depth, because the illumination and its receipt lie in a common plane, the receiving objective interrupts the LED line, which causes a non-homogeneous illumination profile in the receiving area.

SUMMARY OF THE INVENTION

It is an object of the present invention to provide an optoelectronic sensor capable of generating a predetermined illumination profile at the receiving area. Further, the sensor should have an optimal efficiency by directing as much light as possible from the LEDs to the receiving area, and further by making it possible to change the energy distribution within the illumination profile in a preplanned manner. The present invention further provides a cost-efficient way to accomplish the desired results by using light components and/or subassemblies made up of like components.

These objectives are attained in accordance with the present invention in that light bundling or collimating elements are part of an anamorphic imaging optics in which the LEDs have similarly configured condenser elements and an associated cylindrical lens. For different distances to the receiving optics, the LEDs have differing, axially non-aligned positions relative to the optical axis of the corresponding condenser elements. In addition, the direct (surface-to-surface) spacing between the condenser element and the cylindrical lens is varied in dependence on the distance of the receiving optics.

By adjusting the three components of the receiving optics, namely the LED, the condenser element and the cylindrical lens, in dependence on the distance to the receiving optics, the main orientation of the light emitted by the LED can be influenced or changed to generate a desired illumination profile in the receiving area. This makes it possible, for example, to compensate for undesirable peripheral light intensity reductions caused by the receiving optics, as well as for interruptions in the homogeneity of the lighting arrangement over the length of the LED line.

According to another embodiment of the invention, the condenser elements have a planar side and a convex side. The planar side defines a surface that faces the light diode in its entirety. Alternatively, the planar condenser side can include angularly inclined surface portions (also referred to as "wedge surface(s)" which have "wedge angle(s)") which, in addition to changing the axial orientation of the LED relative to the associated condenser element, permit changing the main direction of the light from the LED. This improves the efficiency of the illumination relative to making adjustments to the axial orientation (herein also referred to as "non-axial adjustment(s)") because in this way more light can be directed into the condenser element. The convex upper side of the condenser element can define a spherical as well as an aspherical, toric or Fresnel-shaped surface, or the surface can have another suitable configuration.

For cost reasons, it is not feasible to individually provide each condenser element with a custom-fitted wedge surface. Accordingly, a preferred embodiment of the present invention combines changing of the direction of the light by making changes in the non-axial adjustments and using the above-mentioned wedge surfaces and/or their angles. Accordingly, the various embodiments of the present invention employ lighting arrangements with condenser elements that have like wedge surfaces or angles for changing the overall direction of the light, while fine adjustments are made with non-axial adjustments of the light direction in dependence on the distance of the receiving optics.

In yet another embodiment of the present invention, the planar side of the condenser element is provided with a wedge surface that extends only partially over that side, as is discussed in more detail below. When only one-half of the planar side defines a wedge surface, light exiting from the condenser element is divided and propagates in two main radiation directions. The angle between the two main radiation directions depends on the wedge angle and the refractive index of the condenser element. The energy distribution between the two main radiation directions is principally a function of the proportional surface areas of the planar side with and without a wedge surface. Since the two main radiation directions originate from a common point, and the anamorphic imaging optics linearly expand the light at the receiving area, there will necessarily be an overlap of the two light components. The light distribution in the receiving area, that is, the illumination profile, is a function of this division of the light into the two beams that propagate towards the receiving area.

A similar result can be attained by dividing the planar side of the condenser element into two oppositely effective wedge surfaces. In this case, the optical wedge effect of the wedge surfaces can be more symmetrically divided, which enhances the efficiency with which the light is coupled into the condenser element.

An especially preferred embodiment of the present invention combines the optical effect provided by the wedge surface with the non-axial adjustment of the light diodes relative to the condenser elements. In this embodiment, the center of the planar side of the condenser element is at a right angle to the optical axis, and two peripheral wedge surfaces define optical wedge angles that extend in different, diverging directions. This makes it possible to construct the linearly arranged condenser elements of the lighting arrangement alike while the use of the respective surface segments to a large extent depends on the non-axial adjustments of the light diodes relative to the condenser elements. With respect to condenser elements arranged close to the receiving optics, which requires relatively small non-axial adjustments of the LEDs relative to the condenser elements, the center part of the condenser element can be primarily used. However, as the distance to the receiving object increases, resulting in the need for increasing non-axial adjustments of the LEDs relative to the condenser elements, the peripherally located wedge surfaces can be advantageously used.

The present invention further provides ways for optimizing the illumination profile and increasing the efficiency of the lighting arrangement by changing the proportional size or dimensions of the wedge surfaces and/or the magnitude of the wedge angle. In this manner, condenser elements of like construction can be differently arranged within the linear lighting arrangement. This should be understood as meaning that the condenser elements can be rotated 180° about their optical axes. In this manner, the center part of the condenser element, which is not wedged and is perpendicular to the optical axis, can be used disproportionately when the distance to the receiving optics is relatively small. As the distance to the receiving object increases, the wedging surface with the relatively smaller wedge angle is initially used. As the distance to the receiving optics increases, the wedging surface with the relatively larger wedge angle can be employed.

When a long, stretched-out receiving area must be illuminated at a relatively large distance from the sensor, LED subassemblies are advantageously substituted for individually mounted LEDs. Similarly, individual condenser elements can be replaced by condenser element subassemblies. All LEDs of a given LED subassembly and, likewise, all condenser elements of the condenser subassemblies can then be adjusted together.

This embodiment of the invention, in which individual LEDs are replaced by subassemblies having a plurality of LEDs and, correspondingly, individual condenser elements are replaced by subassemblies having a plurality of condenser elements, the light intensity in the receiving area can be significantly increased. Since each LED and condenser element subassembly extends only over a relatively short section of the linear lighting arrangement, all components which are part of the LED subassemblies and/or the condenser element subassemblies require like axial or non-axial adjustments.

In this embodiment, adjustment required by encountered variations in the distance to the receiving objective are made by adjusting the LED and/or condenser element subassemblies relative to their adjacent subassemblies.

The present invention also enables a cost-effective manufacture in that the individual condenser elements of a condenser element subassembly are preferably plastic lenses which are commonly produced with and form an integral part of a support plate. This can be done, for example, by producing all parts in an injection molding process. This eliminates the need for a further part that receives the condenser elements and eliminates the need for adjusting individual condenser elements. In accordance with the invention, the support plate with the integrally constructed condenser elements can be connected via an adjustable connector with a circuit board that mounts the individual LEDs so that their relative positions are correct. When it is necessary to align the LEDs and condenser elements by means of an axial or non-axial adjustment, the adjustment can be simultaneously performed for all components of the subassembly.

An economically optimal connection between the support plate and the circuit card is attained when the required connectors are also produced with the support plate, for example by way of an injection molding process, so that the support plate, including the connectors, forms a homogeneous, one-piece part.

In a yet further embodiment of the invention, the support plate, which is integrally constructed with the condenser elements, is made of a material which has a coefficient of thermal expansion that is preferably the same, and that is in any event as close as possible to the coefficient of thermal expansion of the material of which the circuit plate is made. As a result, no undesirable changes in the optical alignment of the LED and the associated condenser element take place over relatively large temperature variations.

BRIEF DESCRIPTION OF THE DRAWINGS

FIG. 5b is a side elevational view of FIG. 5a; and

FIG. 6 is a schematic side elevational view of an optoelectronic sensor with a light diode group and a condenser element group.

DESCRIPTION OF THE PREFERRED EMBODIMENT

Figure 1:
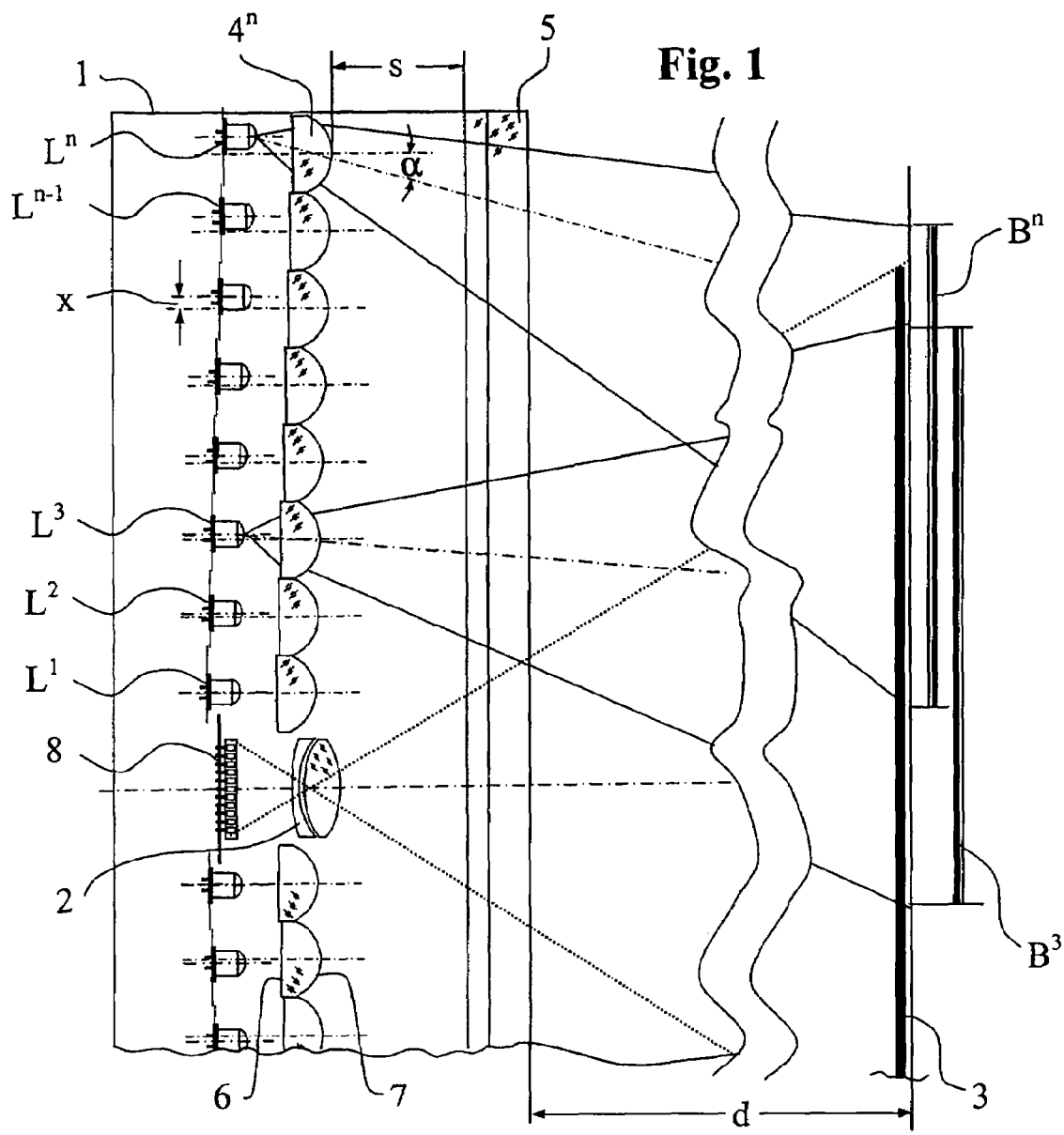
FIG. 1 is a schematic side elevational view of an optoelectronic sensor constructed in accordance with the present invention and shows the receiving optics and the lighting arrangement of the present invention.

FIG. 1 shows in a schematic side elevational view an optoelectronic sensor 1 constructed in accordance with the present invention which has a receiving optics 2 and a lighting arrangement. The receiving system and the lighting arrangement both lie in the plane of the drawing. The lighting arrangement includes light diodes $L^i$ which are arranged along a line above and below receiving optics 2 or a position resolving, linear light receiver 8 aligned with the receiving optics 2, respectively. Each light emitting diode $L^i$ has an associated light bundling or collimating condenser element $4^i$. The condenser elements $4^i$ and a cylindrical lens 5 together form an anamorphotic imaging optics which convert light from light diode $L^i$ at a distance d outside of the optoelectronic sensor into an illuminated line $B^i$. The light bundling condenser element $4^i$ is of the type of a planar-convex lens which has a planar surface 6 facing the light emitting diodes $L^i$ and a convex upper surface 7. The convex upper surface can have a spherical, aspherical, toric or Fresnel-shaped contour. Cylindrical lens 5 can be assembled from two or more partial lenses, or it can be made in a suitable extrusion or pultrusion manufacturing process into a plastic or Fresnel lens.

By using several light emitting diodes $L^i$, together with several light bundling condenser elements $4^i$, a plurality of illuminated lines $B^i$ overlap each other in a receiving area 3 to generate the illuminated line. The present invention permits influencing the overlap of the individual illuminated lines $B^i$ and therewith the distribution of light in the manner in which the overlap is attained. Accordingly, the light intensity profile of the resulting illuminated line can be varied. For this, the light emitting diodes $L^i$ are non-axially adjusted relative to the associated condenser elements $4^i$. Depending on the extent and direction of the axial offset x (FIGS. 4 and 5a), the orientation of the light direction deviates from the angle of the optical axis of the condenser element by the angle α. This enables one to influence the expansion direction of the individual illuminated lines $B^i$. By varying the surface-to-surface distance s between condenser element $4^i$ and cylindrical lens 5, it is further possible to vary the light intensity over the length of the individual illuminated lines $B^i$. With the help of these two variables, that is, the axial offset x and the respective distances s between the condenser elements and the cylindrical lenses, the overlap of the individual illuminated lines $B^i$ can be influenced and varied so that desired illumination profiles can be produced in the resulting illumination line in the receiving area 3.

Figure 2:
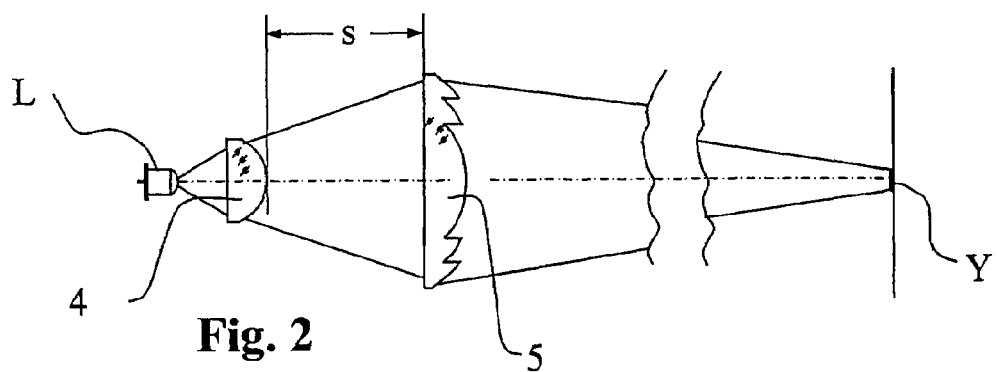
FIG. 2 is a schematic plan view which corresponds to FIG. 1.

FIG. 2 is a schematic plan view corresponding to FIG. 1 and shows that the cylindrical lens 5 (here illustrated as a cylindrical Fresnel lens) also has a convex effect in this view of its axis. FIG. 2 further illustrates that a width Y of illuminated line $B^i$, and therewith its intensity, can be varied by changing the distance s.

Figure 3:
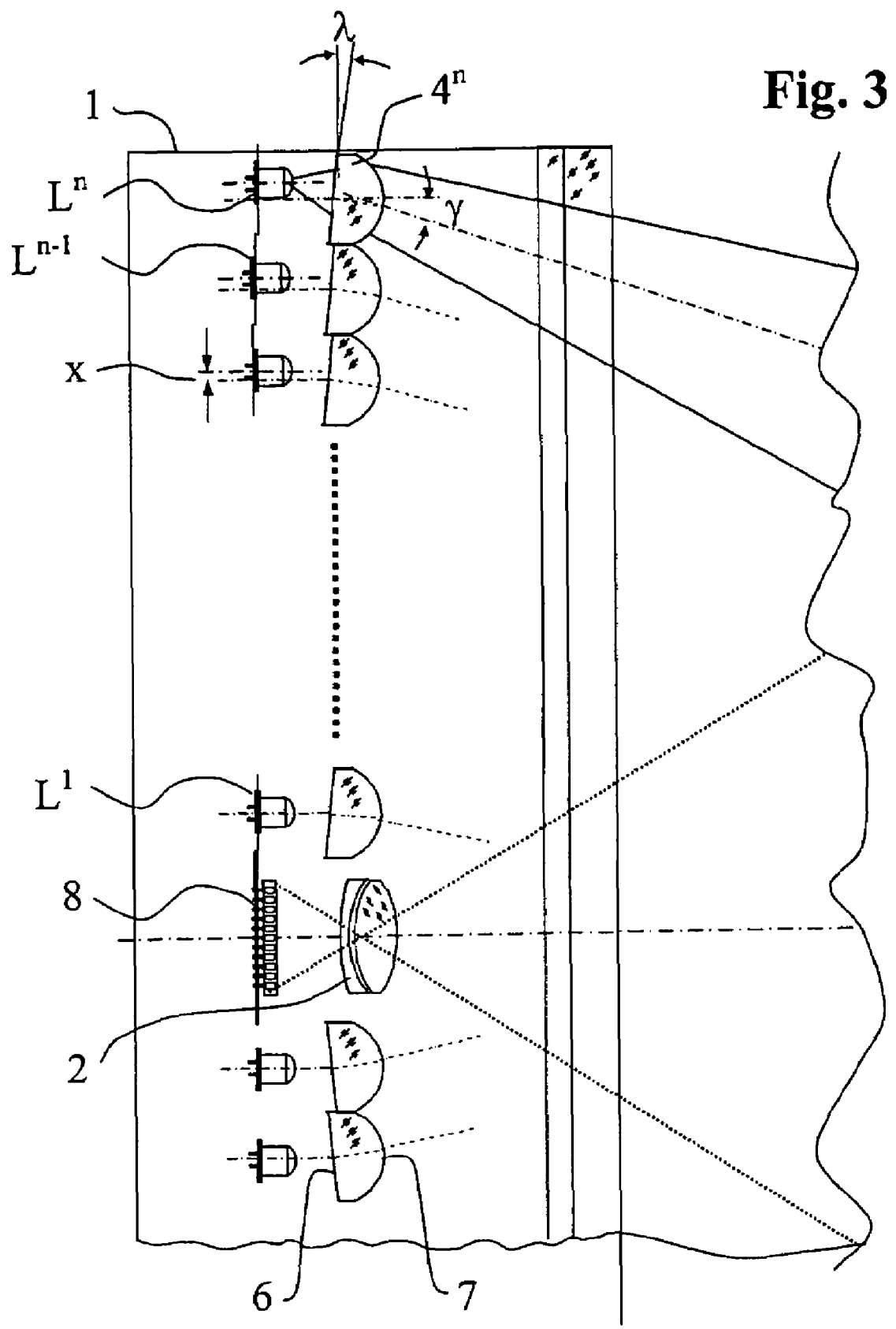
FIG. 3 is a schematic side elevational view of an optoelectronic sensor with a receiving optics and a lighting arrangement and which has condenser elements with wedge-shaped surfaces.

The schematic side elevational view of optoelectronic sensor 1 in FIG. 3 shows that the planar side of condenser elements $4^i$ which face the light emitting diode $L^i$ can include a wedge-shaped surface. This changes the orientation of the planar light receiving surface 6 of condenser elements $4^i$ by an angle λ relative to the optical axis of the condenser elements. The main direction of the light beam exiting the condenser element is changed since there is no axial offset x between the light emitting diode and the condenser element. It is of course also possible to change the angular orientation of the light by the angle γ by combining the optical effects provided by the axial offset with the effects provided by the earlier-described wedge surface. Such a combination has the advantage that each optical component can furnish a lesser angular deviation than would be necessary if the entire angular deflection is generated by a single component. This leads to a more efficient coupling of the light into the condenser element, thereby improving the illumination intensity in the receiving area and enhancing the image quality.

Figure 4:
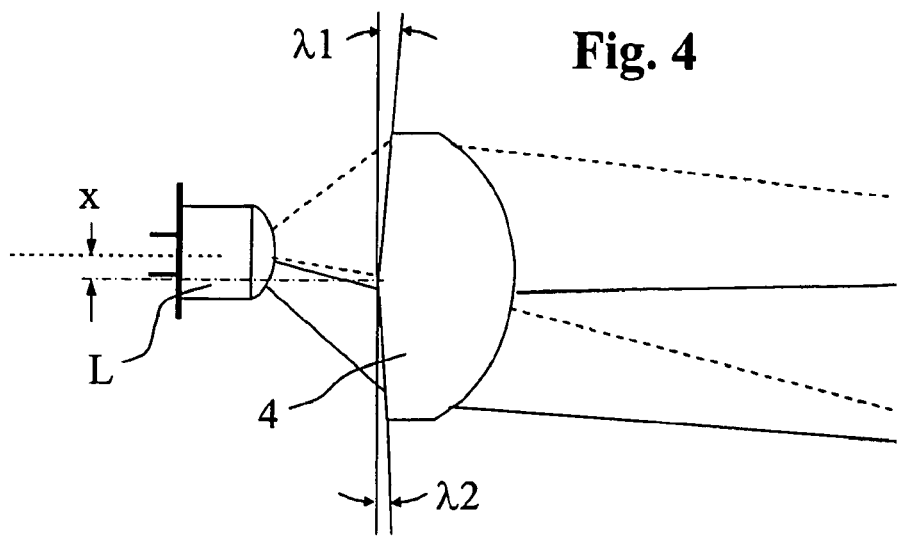
FIG. 4 is a cross-sectional view of a condenser element with two wedge angles.

FIG. 4 shows another embodiment of the condenser element 4. The side of the condenser element facing light emitting diode L has two differently oriented wedge surfaces which form wedge angles $\lambda 1$ and $\lambda 2$. This directs the light from diode L exiting from condenser element 4 in two angularly diverging light emitting directions. The angles of the two light directions relative to the axis of symmetry of condenser element 4 are determined by the angle between them and are a function of the two wedge angles $\lambda 1$ and $\lambda 2$ and, if applicable, of the axial offset x between the light emitting diode L and the condenser element 4. The two main light beam orientations and individual illuminated lines $B^i$ resulting from such an offset provide a further alternative for optimizing the illumination profile.

Figure 5A:
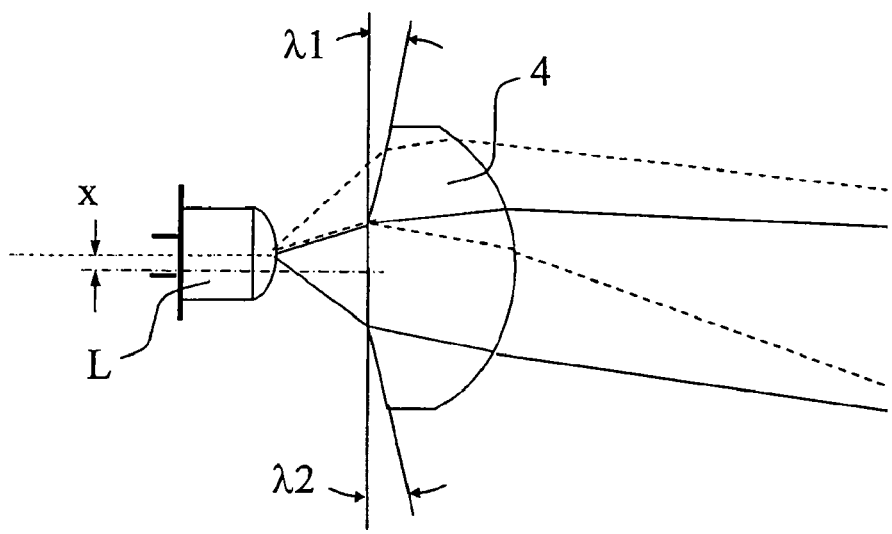
FIG. 5a is a cross-sectional view of a condenser element with a center area and two wedge angles.
Figure 5B:
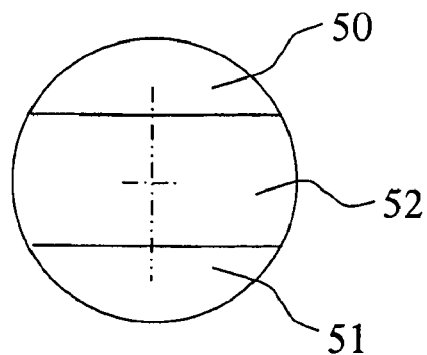

Referring to FIGS. 5a and 5b, the two wedge surfaces can be restricted to peripheral areas of the planar side of condenser element 4. As is best seen in FIG. 5b, this results in the formation of two segments 50, 51 defined by the wedge surfaces and a centrally located planar portion 52 that does not have the wedging effect of the wedge-shaped segments. This embodiment, together with an additional axial offset x, significantly increases the available options for optimizing the desired illumination profile. For example, the three surface portions 50, 51 and 52 can be given differing sizes. It is also possible to make the wedge angles $\lambda 1$ and $\lambda 2$ different from each other and, moreover, the degree of the additional axial offset x can be varied and predetermined.

When the optoelectronic sensor of the present invention must illuminate a relatively long receiving area 3, and the receiving area is additionally at a large distance d from the optoelectronic sensor, a large number of light emitting diodes $L^i$ and associated condenser elements $4^i$ must be linearly arranged relative to each other.

In such an event, individual LEDs and associated condenser elements can be arranged in an LED and condenser element assembly 60, as is illustrated in FIG. 6 with respect to $LED^{n-3}$. Since the light emitting diode and condenser element assemblies typically cover only a relatively small section of the entire linear lighting arrangement, the light emitting diode assembly and/or the condenser element assembly 60 can be given the same axial alignment, axial offset and/or distance s to cylindrical lens 5.

Adjustment variances which depend on the distance of the receiving objective are in such instances made from one LED assembly and/or condenser element assembly to the next corresponding assembly.

FIG. 6 also illustrates that the LEDs of a given LED assembly are mounted on a common circuit board 61. In like manner, the condenser elements of a condenser element assembly are mounted on a common support plate 62. To make adjustments and to set any desired axial offset, connecting elements 63 connect and maintain circuit board 61 and support plate 62 in their precise relative positions. Preceding and/or subsequent LED/condenser element subassemblies are set and adjusted to generate the desired illumination profile by changing the relative position of the affected circuit board 61 and/or support plate 62. The final installation of the lighting arrangement is greatly simplified by mounting groups of LEDs and condenser elements in subassemblies as described above. The assembly and alignment of the LED and condenser element subassemblies are greatly simplified. For example, the condenser element of a group of such elements in a subassembly can be made from plastic materials by injection molding it together with the associated support plate 62. In this manner, the precise dimensioning of the injection mold is used to assure the exact relative positioning of the condenser elements on support plate 62. The same holds true for the positioning of the LEDs, which are placed on the circuit board 61 by high precision, automated component positioning machines. Thus, all LEDs and all condenser elements of a subassembly can be exactly aligned and oriented with respect to each other in one simple step. It is particularly advantageous for maintaining the proper positioning and alignment of the LEDs and the condenser elements to make circuit board 61 and support plate 62 of like materials which have the same or very similar coefficients of thermal expansion. This assures that the desired alignment precision is maintained over a relatively large range of temperature variations.

What is claimed is:

1. An optoelectronic sensor having a receiving optics and a lighting arrangement in a vicinity of the receiving optics comprising a plurality of light emitting diodes (LEDs) linearly arranged relative to each other for illuminating a light receiving area, and an anamorphic imaging optics for each LED including an optical condenser element having a planar side facing the LED and an oppositely facing non-planar side and a cylindrical lens associated with the condenser elements, the optical condenser elements of the arrangement being of like construction, each of the LEDs being axially offset relative to an optical axis of associated condenser elements, wherein the offset is dependent on a distance between the LEDs and the receiving optics.

2. An optoelectronic sensor according to claim 1 wherein the non-planar side of the optical condenser elements has one of a spherical, aspherical and toric shape.

3. An optoelectronic sensor according to claim 1 wherein the optical condenser elements of the arrangement are of like construction and wherein a surface-to-surface distance between the condenser elements and the cylindrical lens is a function of a distance of the condenser elements to the receiving optics.

4. An optoelectronic sensor according to claim 1 wherein the entire planar side is non-perpendicular to the optical axis of the condenser element and the optical axis of the condenser element is tilted relative to an optical axis of the LED.

5. An optoelectronic sensor according to claim 1 wherein the planar side comprises a centrally located planar portion that is non-perpendicular to an optical axis and that extends at most over about one-half of the planar side.

6. An optoelectronic sensor according to claim 1 wherein the planar side comprises first and second wedge surfaces that are non-perpendicular to an optical axis of the condenser element, said wedge surfaces deflecting light passing through the condenser element in diverging directions.

7. An optoelectronic sensor according to claim 1 wherein the planar side comprises a centrally located planar portion that is perpendicular to an optical axis of the condenser element and first and second peripherally located wedge surfaces which form optical wedge angles directing the light in diverging directions.

8. An optoelectronic sensor according to claim 7 wherein the first and second wedge surfaces have differently sized surface areas.

9. An optoelectronic sensor according to claim 6 wherein the optical wedge angles are of different magnitudes.

10. An optoelectronic sensor according to claim 1 including a LED subassembly comprising a plurality of LEDs and a condenser element subassembly comprising a plurality of condenser elements, wherein the LEDs and the condenser elements of the corresponding subassemblies have like optical and geometric characteristics.

11. An optoelectronic sensor according to claim 10 wherein the condenser element subassembly comprises a plurality of like plastic lenses mounted on a support plate, the plastic lenses and the support plate being commonly produced by molding.

12. An optoelectronic sensor according to claim 10 wherein the condenser element subassembly is produced by injection molding.

13. An optoelectronic sensor according to claim 10 wherein the LEDs of the LED subassembly are mounted on a common circuit board.

14. An optoelectronic sensor according to claim 11 wherein the condenser elements are arranged on a support plate and the LEDs are arranged on a circuit board, and including a connector for adjustably connecting the support plate and the circuit board.

15. An optoelectronic sensor according to claim 14 wherein the connectors are integrally constructed with the support plate.

16. An optoelectronic sensor according to claim 15 wherein the connectors and the support plate are injection molded together.

17. An optoelectronic sensor according to claim 14 wherein the support plate and the circuit board are constructed of materials which have substantially like coefficients of thermal expansion.

\* \* \* \* \*